United States Patent
Okudaira et al.

(10) Patent No.: US 11,703,329 B2
(45) Date of Patent: Jul. 18, 2023

(54) SURVEYING INSTRUMENT INCLUDING GUIDE LIGHT IRRADIATION UNIT

(71) Applicant: TOPCON CORPORATION, Tokyo (JP)

(72) Inventors: Yosuke Okudaira, Tokyo (JP); Akinobu Sugiura, Tokyo (JP); Yasutoshi Aoki, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 443 days.

(21) Appl. No.: 16/985,778

(22) Filed: Aug. 5, 2020

(65) Prior Publication Data

US 2021/0063153 A1 Mar. 4, 2021

(30) Foreign Application Priority Data

Aug. 28, 2019 (JP) ................. 2019-155973

(51) Int. Cl.
*G01C 3/08* (2006.01)
*G01C 15/00* (2006.01)
*G01C 3/02* (2006.01)

(52) U.S. Cl.
CPC ............. *G01C 15/002* (2013.01); *G01C 3/02* (2013.01)

(58) Field of Classification Search
None
See application file for complete search history.

(56) References Cited

U.S. PATENT DOCUMENTS

| 2009/0235543 A1* | 9/2009 | Hayashi | ................. G01S 17/42 356/4.01 |
| 2015/0052766 A1* | 2/2015 | Chiba | ..................... G01C 3/00 33/299 |

FOREIGN PATENT DOCUMENTS

| EP | 3786580 A1 * | 3/2021 | ............. G01C 15/02 |
| JP | 2015040830 A | 3/2015 | |
| JP | 2019067256 A | 4/2019 | |

* cited by examiner

*Primary Examiner* — Mark Hellner
(74) *Attorney, Agent, or Firm* — Thomas W. Cole; Calderon Safran & Cole P.C.

(57) ABSTRACT

Provided is a surveying instrument configured so that the optical axis of a guide light irradiation unit that irradiates guide light for guiding a survey operator and the optical axis of a lens barrel portion of a distance-measuring optical system become parallel to each other on a horizontal plane. The guide light irradiation unit is not disposed above the lens barrel portion that substantially matches a collimation direction is horizontally shifted with respect to the lens barrel portion. The horizontal shift distance D is configured so that a horizontal distance D between the optical axis of guide light and the optical axis of the lens barrel portion satisfies $\tan(\alpha/2) \times C_{min} > D$ provided that $\alpha$ is an irradiation angle of the guide light in the horizontal direction, and $C_{min}$ is a shortest use distance of the surveying instrument.

6 Claims, 8 Drawing Sheets

SURVEYING INSTRUMENT INCLUDING GUIDE LIGHT IRRADIATION UNIT

TECHNICAL FIELD

The present invention relates to a surveying instrument including a guide light irradiation unit that irradiates guide light to guide a survey operator.

BACKGROUND ART

There is a surveying instrument including a guide light irradiation unit that irradiates guide light for guiding a survey operator holding a survey pole to a piling point. For example, Patent Literature 1 discloses a surveying instrument including a surveying instrument main body that supports a lens barrel portion of a distance-measuring optical system vertically rotatably, a guide light irradiation unit that irradiates guide light, and a cover member that covers the surveying instrument main body including the lens barrel portion and the guide light irradiation unit. The guide light irradiation unit is installed on an upper portion of the surveying instrument main body and covered by the cover member, so that an optical axis of the guide light irradiation unit does not need to be adjusted even when the cover member is removed. The guide light consists of light differing in pattern between the left and the right of a vertical plane including the optical axis, and is irradiated while extending in the up-down direction.

However, the guide light in Patent Literature 1 is diffused in the up-down direction by using a cylindrical lens, and this poses a problem in which a guide light reach distance becomes shorter according to the diffusion of the guide light. To solve this problem, in Patent Literature 2, a guide light irradiation unit is configured by juxtaposing a plurality of guide light irradiators so that the irradiators have angles in the up-down direction. Accordingly, it becomes possible to extend the light reach distance and to irradiate a guide light extending in the up-down direction.

CITATION LIST

Patent Literatures

[Patent Literature 1] Japanese Published Unexamined Patent Application No. 2015-40830
[Patent Literature 2] Japanese Published Unexamined Patent Application No. 2019-067256

SUMMARY OF INVENTION

Technical Problem

By equipping the surveying instrument disclosed in Patent Literature 1 with the guide light irradiation unit disclosed in Patent Literature 2, advantages of these can be obtained. However, since a use range (maximum angle) of the surveying instrument in the vertical direction is small compared to the expanded guide light use range, at a survey site with level differences, measurement cannot be performed at one time in some cases, such as in a case where measurement is made by setting a reference point at different locations.

To solve this, it is necessary to expand the use range of the surveying instrument in the vertical direction in line with the use range of the guide light irradiation unit. In the existing configuration, a rotation range of the lens barrel portion is wide, and the use range of the surveying instrument can be expanded by extending in the up-down direction a window that is provided in the cover member and transmits distance-measuring laser light, however, the cover member itself is also inevitably extended in the up-down direction, and further, when a plurality of guide light irradiators are juxtaposed in the up-down direction above the window so that a collimation axis and the optical axis of the guide light match in the vertical direction, this poses a problem in which the size in the up-down direction is significantly increased.

The present invention was made in view of this problem, and provides a surveying instrument entirely covered by a cover member and configured so that the size of the cover member (housing) is held within an appropriate range, while a guide light irradiation range and a survey range are extended.

Solution to Problem

Therefore, in an aspect of the present disclosure, a surveying instrument including a surveying instrument main body made up of a base portion and a rotating pedestal to be rotated horizontally with respect to the base portion, a guide light irradiation unit configured to irradiate guide light to indicate a collimation direction of the surveying instrument main body to a survey operator, and a cover member, in which on the rotating pedestal, a support member by which a lens barrel portion of a distance-measuring optical system is vertically rotatably supported is provided, and the cover member covers the surveying instrument main body including the support member and the lens barrel portion and covers the guide light irradiation unit, is configured so that the guide light consists of light differing in pattern between the left and the right of an optical axis center of the guide light irradiation unit, the guide light irradiation unit is horizontally shifted with respect to the lens barrel portion and held by the support member so that an optical axis of the guide light irradiation unit becomes substantially parallel to an optical axis of the lens barrel portion in the horizontal direction, and a horizontal shift distance D between the optical axis of the guide light irradiation unit and the optical axis of the lens barrel portion satisfies $\tan(\alpha/2) \times C\min > D$ provided that $\alpha$ is an irradiation angle of the guide light in the horizontal direction, and $C\min$ is a shortest use distance of the surveying instrument.

In this aspect, even when the guide light irradiation unit is disposed to be shifted in the horizontal direction from a state where the optical axis of the guide light irradiation unit matches the optical axis of the lens barrel portion in the horizontal direction, guide light can be visually recognized even at the shortest use distance, so that the effect of the shifting disposition in the horizontal direction can be negated. The guide light irradiation unit no longer needs to be disposed above the lens barrel portion, so that the use range of the lens barrel portion in the up-down direction can be accordingly expanded, and in line therewith, the guide light use range can also be expanded. When the use range is expanded while the guide light irradiation unit is kept above the lens barrel portion, the housing needs to be greatly extended in the up-down direction, but, by an horizontal shifting disposition, the housing does not need to be greatly enlarged as compared to the expansion of the use range, so that the size of the housing can be held within an appropriate range.

In an aspect, the guide light irradiation unit includes a plurality of irradiators configured to irradiate basic guide lights differing in pattern between the left and the right of an optical axis center of the guide light irradiation unit, the plurality of irradiators are juxtaposed in the vertical direction, and synthetic light of basic guide lights respectively irradiated from the plurality of irradiators are visually recognized as guide light. According to this aspect, not only can the guide light be extended in the up-down direction, but light to be visually recognized by an operator is also provided as a sum of light sources, so that a visual recognition distance can also be extended.

In an aspect, the cover member has a window on the optical axis of the lens barrel portion, and the window is formed to extend vertically from a substantially bottom surface to a substantially upper surface of the cover member. According to this aspect, a range through which distance-measuring light of the lens barrel portion can be transmitted is expanded, and the use range of the surveying instrument in the up-down direction can be extended.

In an aspect, the window is formed to extend from a substantially bottom surface to a substantially upper surface of the cover member, and to further extend over the upper surface so as to be continuous over the two surfaces. According to this aspect, a range through which the distance-measuring light of the lens barrel portion can be transmitted can be expanded upward to 90 degrees, and the use range of the surveying instrument in the up-down direction can be extended without extending the cover member in the up-down direction.

In an aspect, the guide light irradiation unit is disposed so that a rotation shaft of the lens barrel portion and a guide light irradiation port of the light guide irradiation unit substantially match in the up-down direction. According to this aspect, the angle relationship between the guide light irradiation unit and the lens barrel portion in the vertical direction becomes equal, so that it no longer becomes necessary to consider adjustments, etc.

In an aspect, the guide light irradiation unit is supported by the support member vertically slidably or vertically rotatably. According to this aspect, the guide light irradiation range can be extended in the up-down direction.

Effect of Invention

As is clear from the description given above, according to the present invention, a surveying instrument including a guide light irradiation unit and a housing whose size is held within an appropriate range can be provided.

BRIEF DESCRIPTION OF DRAWINGS

FIGS. 7A and 7B are optical diagrams illustrating an example of an optical system of an irradiator, and FIG. 7A is an optical diagram in the horizontal direction as viewed from above, and FIG. 7B is an optical diagram in the vertical direction as viewed sideways.

DESCRIPTION OF EMBODIMENTS

Hereinafter, a detailed embodiment of the present invention is described with reference to the drawings. The embodiment is not intended to limit the invention but is an illustration of the invention, and all features and combinations thereof described in the embodiment are not necessarily essential for the invention.

(Outline of Invention)

Figure 1:
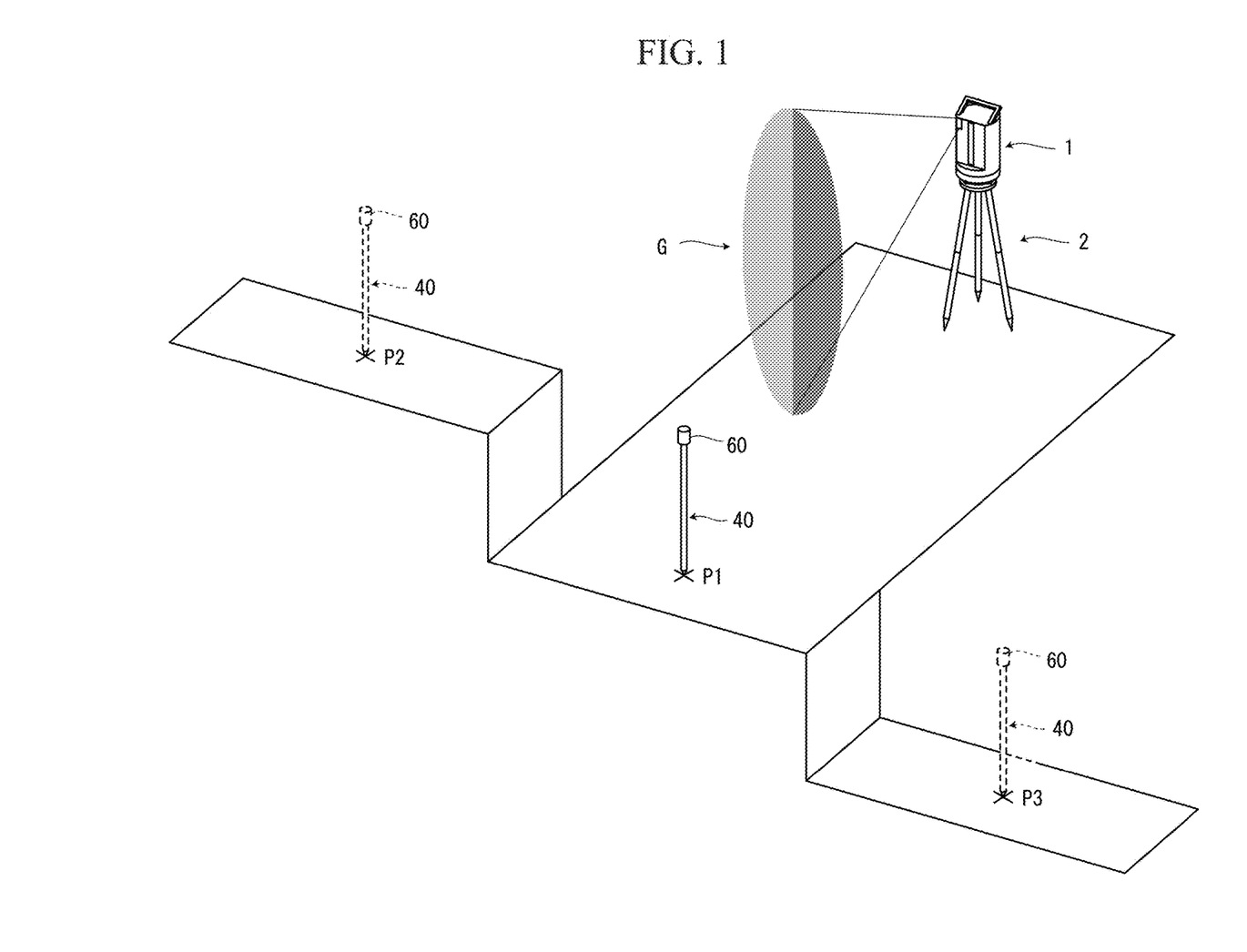
FIG. 1 is a schematic perspective view for illustrating an outline of a surveying instrument according to the present invention.

FIG. 1 is a schematic perspective view for illustrating an outline of a surveying instrument 1 according to the present invention. The surveying instrument 1 is a total station having a distance and angle measuring function and a tracking function, and is capable of irradiating guide light G for guiding an operator. The guide light G consists of light differing in pattern between the left and the right of an optical axis center, and is irradiated in a fan shape extending in the up-down direction.

The optical axis of the guide light G is substantially parallel to a collimation direction of the surveying instrument 1 on a horizontal plane, and is configured to be at a predetermined distance in the horizontal direction from a collimation axis, however, in an operation process for guiding an operator by the guide light G, the distance is sufficiently negligible (described later). Therefore, it is regarded that fan-shaped guide light G differing in pattern between the left and the right of the collimation axis of the surveying instrument 1 as a boundary on a horizontal plane and extending horizontally is irradiated.

As a method of use, first, the surveying instrument 1 is mounted on a tripod 2 and installed at a known point, and is collimated in a direction toward a piling point P1, and irradiates guide light G. An operator holding a pole 40 equipped with a prism 60 as a target of the surveying instrument 1 can determine by himself/herself which side the operator should move to, the left or the right, according to a pattern of the guide light G viewed from the surveying instrument 1. For example, in the present embodiment, the guide light G is configured so that, as viewed from an operator side, red light is viewed at the right side, and green light is viewed at the left side, and therefore, when the operator confirms red light, the operator is on the right side relative to the piling point P, so that it is only necessary to move leftward from a current location while facing the surveying instrument 1. In this way, the operator is guided to the front of an irradiation unit for the guide light G (the collimation direction of the surveying instrument 1) that is a direction in which left and right colors of the guide light G are substantially equally viewable.

At the same time, search and scanning of the target by tracking light has been performed, and the tracking light has been reciprocated in the up-down direction. After the operator is direction-guided to the vicinity of the piling point P1 and the prism 60 as a target is locked on, the guide light G goes off. Based on this, the operator can know that the target has been locked on. Here, a distance and an angle to the prism are measured by the surveying instrument 1, difference information between a current location of the prism 60 and the piling point P1 is transmitted to a terminal such as a tablet that the operator carries with him/her, and the operator is guided in more detail, and the pole 40 is erected at the piling point P1. Accordingly, the piling point P1 can be highly accurately set.

The guide light G is configured to extend vertically, and therefore, even when there is a level difference between the piling points P2 and P3, an operator can easily find the guide light G. The surveying instrument 1 also has a wide survey range in the vertical direction, and is suitable for a survey site with great level differences.

For the guide light G, lights in various patterns can be used such as, in addition to light in colors different between the left and the right, one of which being a blinking light and the other being a continuous light, or light different in blinking periods between the left and the right.

(Surveying Instrument)

Figure 2:
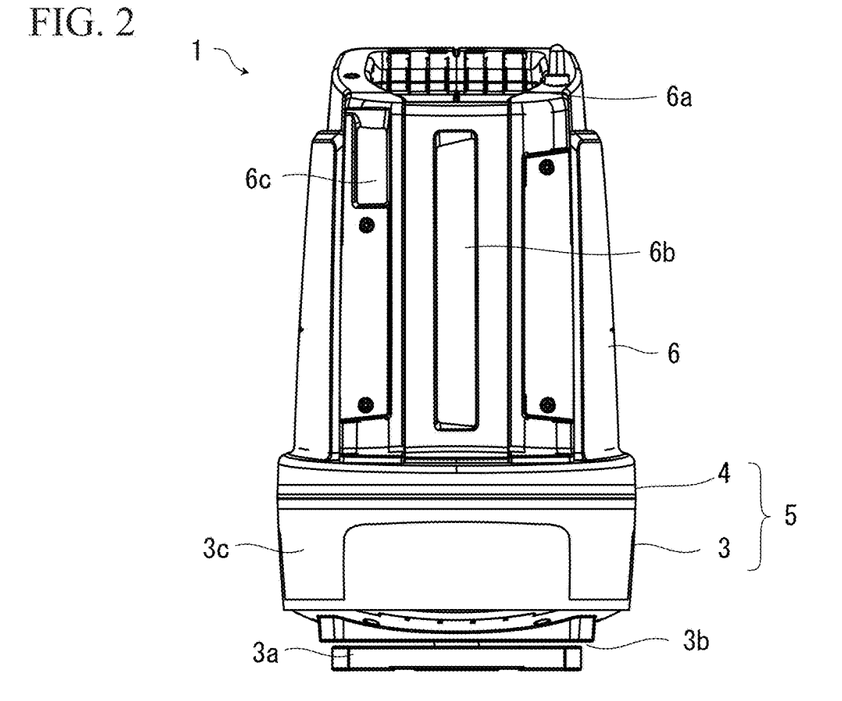
FIG. 2 is a front view of the surveying instrument.
Figure 3:
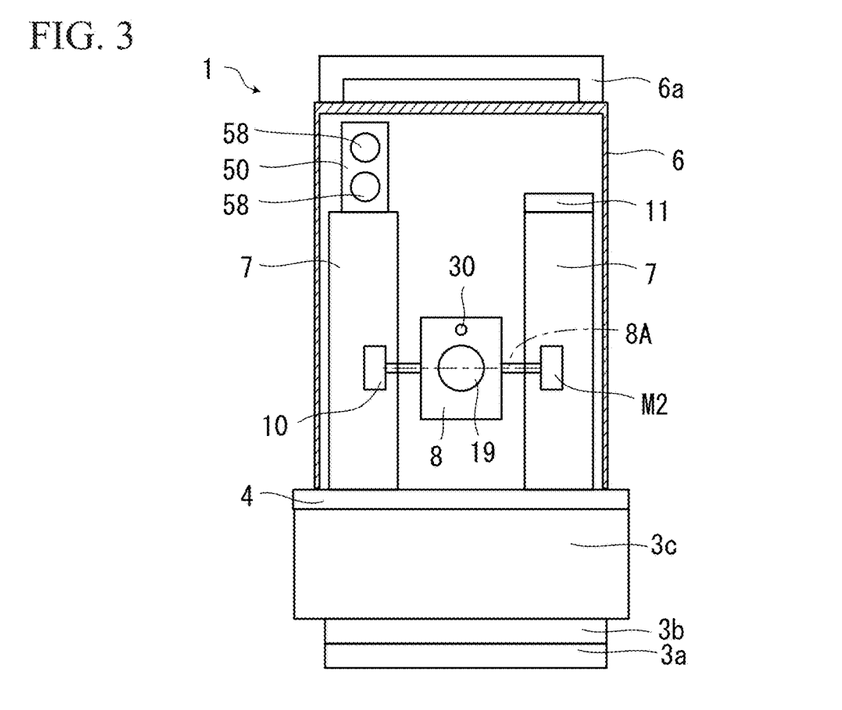
FIG. 3 is a schematic view schematically illustrating a relationship between an internal structure of the surveying instrument and a cover member.

The surveying instrument 1 is described with reference to FIGS. 2 to 9. FIG. 2 is a front view of the surveying instrument 1, and FIG. 3 is a schematic view schematically illustrating an internal structure of the surveying instrument 1. As illustrated in FIGS. 2 and 3, the surveying instrument 1 is configured to include a surveying instrument main body 5 made up of a base portion 3 and a rotating pedestal 4 to be rotated horizontally with respect to the base portion 3, and a cover member 6.

The base portion 3 mainly consists of a fixing seat 3a to be fixed to a tripod 2, a leveling base 3b including a leveling screw (not illustrated), and a case 3c which incorporates a drive mechanism such as a horizontal driving motor M1 that drives the rotating pedestal 4 to rotate horizontally.

On the rotating pedestal 4, a pair of support members 7 and 7 are erected. Between the pair of support members 7 and 7, a lens barrel portion 8 of a distance-measuring optical system and a tracking optical system is disposed. The lens barrel portion 8 is vertically rotatably supported by a horizontal shaft 8A provided across the pair of support members 7 and 7.

To one end portion of the horizontal shaft 8A, a vertical driving motor M2 that drives the lens barrel portion 8 to rotate vertically is fixed, and at the other end portion, an encoder 10 for detecting a rotation angle of the lens barrel portion 8 is provided.

At an upper end portion of one support member 7, a control circuit board 11 that controls the horizontal rotation of the rotating pedestal 4 and the vertical rotation of the lens barrel portion 8 is disposed, and at an upper end portion of the other support member 7, a guide light irradiation unit 50 is disposed.

The horizontal driving motor M1, the vertical driving motor M2, and the encoder 10, etc., are connected to the control circuit board 11, and in the control circuit board 11, a CPU 9 to be described later is provided.

The guide light irradiation unit 50 irradiates guide light G to guide a survey operator. An optical axis L of the guide light G and an optical axis L2 of the lens barrel portion 8 are configured so as to become substantially parallel to each other in a plan view.

The cover member 6 has a handle portion 6a on an upper surface, a window 6b extending in the up-down direction on a front surface, and a guide light window 6c at an upper corner of the front surface. The window 6b is formed on the optical axis of the lens barrel portion 8, and transmits infrared laser light of the distance-measuring and tracking optical systems to be described later. Similarly, the guide light window 6c is formed on the optical axis of the guide light G, and transmits the guide light G. If the window 6b is perpendicular to the optical axis of the infrared laser light, the infrared laser light reflected by the window 6b directly returns and adversely affects distance and angle measurements, so that to avoid this, the window 6b is disposed so as not to become perpendicular to the optical axis of the infrared laser light and slightly tilted in the horizontal direction so as to prevent errors caused by the reflection.

At a contact point of the rotating pedestal 4 with the cover member 6, a seal member (not illustrated) to prevent entrance of rainwater, etc., is provided.

There are clearances provided between the cover member 6 and the guide light irradiation unit 50; the cover member 6 and the control circuit board 11. Accordingly, when attaching and removing the cover member 6, the cover member 6 can be prevented from making contact with the guide light irradiation unit 50. Even when an impact from the outside is applied to the cover member 6, it is possible to prevent the control circuit board 11 and the guide light irradiation unit 50 inside the cover member 6 from being affected as much as possible. The cover member 6 covers the guide light irradiation unit 50 and the lens barrel portion 8 while separating from these, and even when the cover member 6 is removed, there is no need to adjust the optical axes of the guide light irradiation unit 50 and the lens barrel portion 8.

(Block Diagram)

Figure 4:
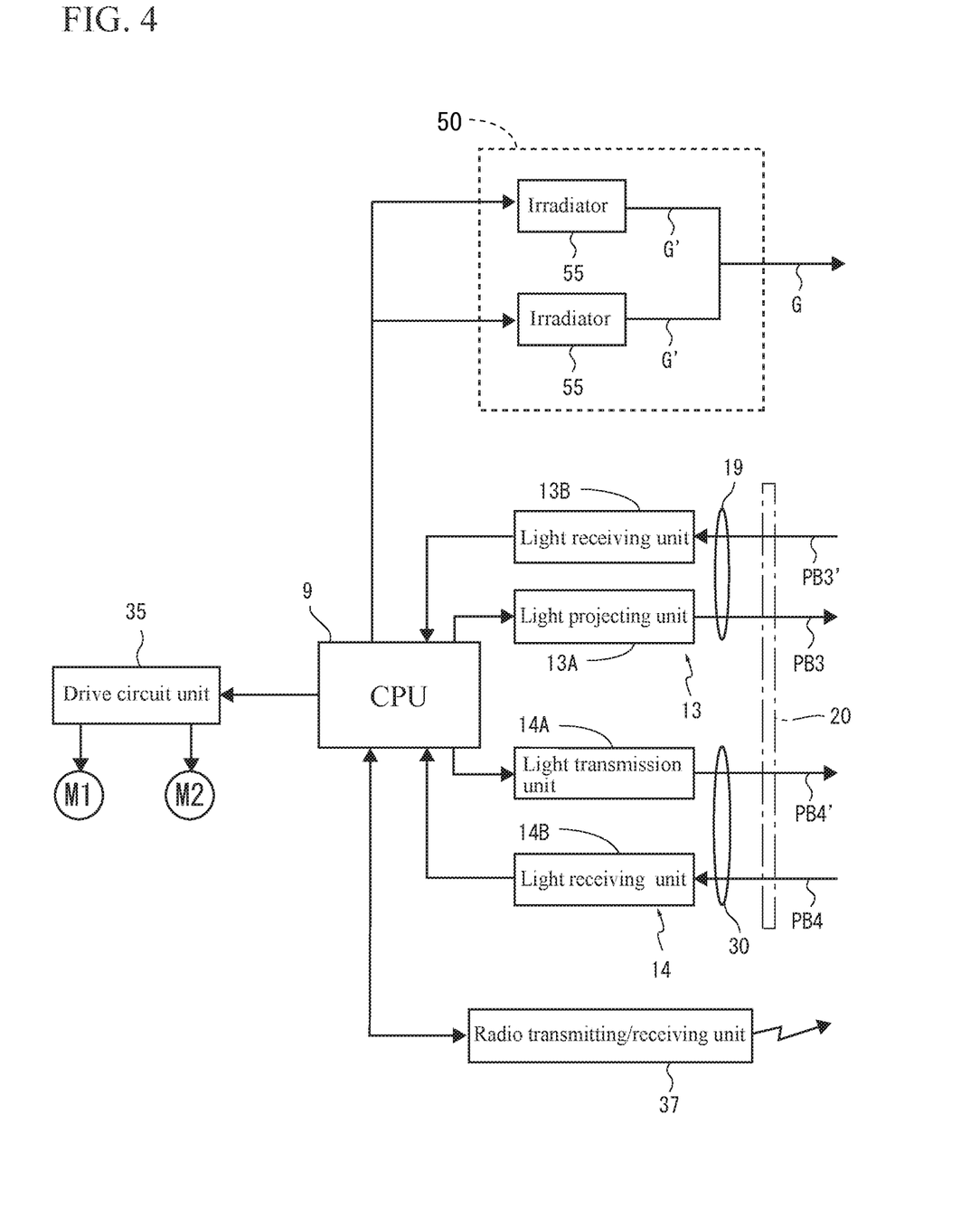
FIG. 4 is a block circuit diagram illustrating a configuration of optical systems of the surveying instrument.

Next, various optical systems are described. FIG. 4 is a block circuit diagram illustrating a configuration of optical systems of the surveying instrument 1. The CPU 9 includes circuits for performing various arithmetic operations and a memory, and to the CPU 9, a radio transmitting/receiving unit 37, a distance-measuring optical system 13, a tracking optical system 14, a drive circuit unit 35, and the guide light irradiation unit 50 are connected, and the CPU 9 performs arithmetic operations from data and programs in the memory and input data and received data, and issues command signals and controls these connected components.

(Configuration of Distance-Measuring Optical System)

Figure 5:
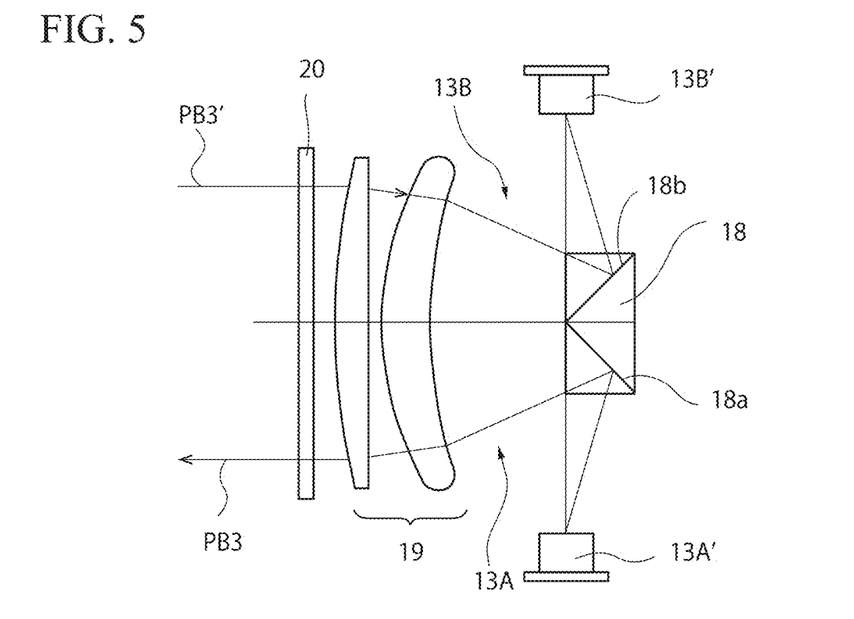
FIG. 5 is an optical diagram illustrating an example of a distance-measuring optical system.

In the lens barrel portion 8, the distance-measuring optical system 13 and the tracking optical system 14 are provided. The distance-measuring optical system is described first. As illustrated in FIG. 5, the distance-measuring optical system 13 includes a light transmission unit 13A and a light receiving unit 13B. The light transmission unit 13A has a light source 13A', and the light receiving unit 13B has a light receiving element 13B'.

The light source 13A' emits infrared laser light. The infrared laser light is reflected to an objective lens 19 by a dichroic mirror surface 18a of a beam splitter 18, and emitted to the outside of the surveying instrument 1 through a cover glass 20 and emitted as parallel light PB3.

The parallel light PB3 is reflected by the prism 60 (refer to FIG. 1) as a target of the surveying instrument 1, returns as reflected light PB3' to the objective lens 19 through the cover glass 20, and is reflected by a dichroic mirror surface 18b of the beam splitter 18 and converged into the light receiving element 13B'.

A light receiving output of the light receiving element 13B' is input to the CPU 9. The CPU 9 operates a distance to the prism 60 based on the light receiving output of the light receiving element 13B'.

(Configuration of Tracking Optical System)

Figure 6:
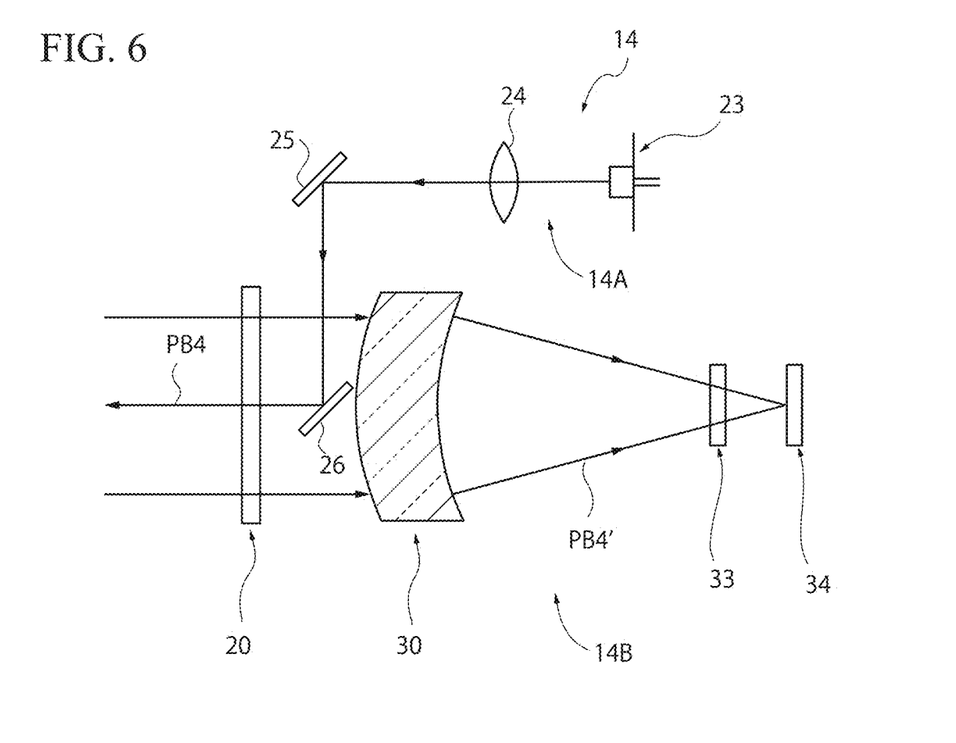
FIG. 6 is an optical diagram illustrating an example of a tracking optical system.

A configuration of the tracking optical system 14 is then described. The tracking optical system 14 is used to lock on the prism 60. As illustrated in FIG. 6, this tracking optical system 14 includes a laser diode 23, a collimating lens 24, reflection mirrors 25 and 26, an objective lens 30, the cover glass 20, a noise light removing filter 33, and a light receiving element 34.

The laser diode 23, the collimating lens 24, and the reflection mirrors 25 and 26 constitute most of a light transmission unit 14A. The objective lens 30, the noise light removing filter 33, and the light receiving element 34 constitute most of a light receiving unit 14B.

The laser diode 23 emits, as tracking light, infrared laser light PB4 of a wavelength different from a wavelength of distance-measuring light of the distance-measuring optical system 13. The infrared laser light PB4 is collimated to be substantially parallel light by the collimating lens 24.

The infrared laser light PB4 reflected by the reflection mirrors 25 and 26 is emitted to the outside of the surveying instrument 1 through the cover glass 20, and by this infrared laser light PB4, the prism 60 is searched for and scanned. When the prism 60 is in the search range, the infrared laser light PB4 is reflected by the prism 60 and returns to the objective lens 30.

The reflected light PB4' of the infrared laser light PB4 is converged by the objective lens 30, and passes through the noise light removing filter 33 to be imaged on the light receiving element 34. The noise light removing filter 33 has a function to transmit light of the same wavelength as that of the reflected light PB4'.

In the present embodiment, the objective lens 30 of the tracking optical system 14 and the objective lens 19 of the distance-measuring optical system 13 are configured as separate members, however, these lenses may be integrally configured.

(Configuration of Drive Unit)

The surveying instrument 1 includes the drive circuit unit (refer to FIG. 4). To this drive circuit unit 35, the horizontal driving motor M1 and the vertical driving motor M2 are connected.

The drive circuit unit 35 is controlled by the CPU 9, and the CPU 9 has a function to output a rotation permission signal for the horizontal driving motor M1 to the drive circuit unit 35 when the radio transmitting/receiving unit 37 receives a lens barrel portion rotation permission signal.

The CPU 9 operates a rotation angle in the horizontal direction from a current angle in the horizontal direction that the lens barrel portion 8 of the surveying instrument 1 faces to a next piling point based on a reference azimuth signal and the lens barrel portion rotation permission signal. By outputting an operation result by the CPU 9 to the drive circuit unit 35, the drive circuit unit 35 can drive the horizontal driving motor M1 to rotate the lens barrel portion 8 from the direction in which the piling point P1 is present to the direction in which the next piling point P2 is present and stop the lens barrel portion at a position after the rotation.

The drive circuit unit 35 has a function to rotate the vertical driving motor M2 forward and reversely, and accordingly, by rotating the lens barrel portion 8 in the up-down direction, the infrared laser light PB4 of the tracking optical system 14 can be reciprocated for scanning in the up-down direction.

(Irradiator)

Next, the guide light irradiation unit 50 is described. The guide light irradiation unit 50 includes a plurality of (in the present embodiment, two) irradiators 55 (refer to FIG. 4). The irradiator 55 irradiates basic guide light G' that differs in pattern between the left and the right of a vertical plane including an optical axis L' as an irradiation direction. Synthetic light of the basic guide lights G' irradiated from the plurality of irradiators 55 is visually recognized as guide light G.

Figure 7A:
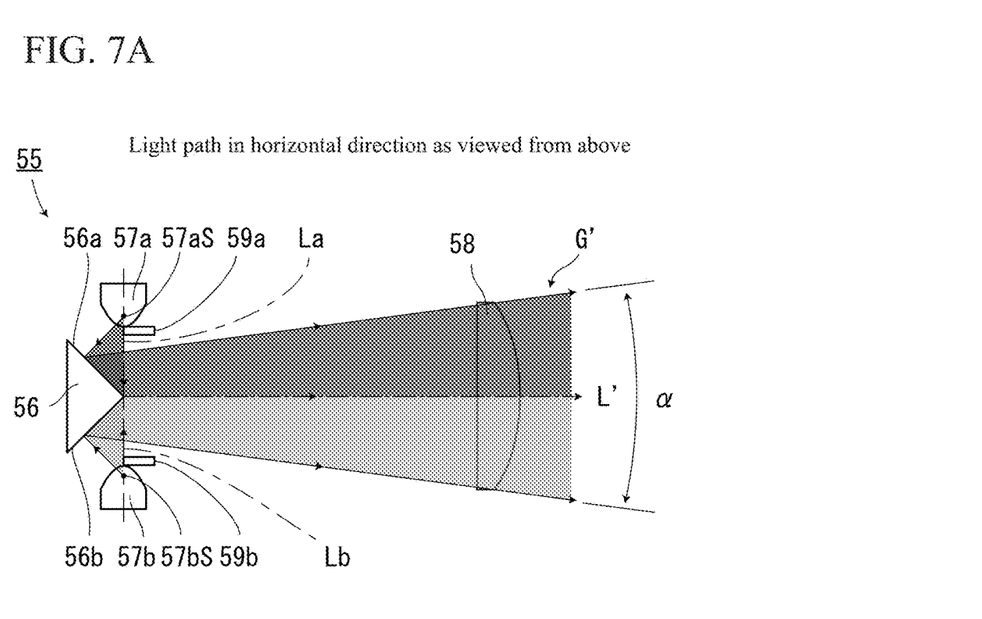
Figure 7B:
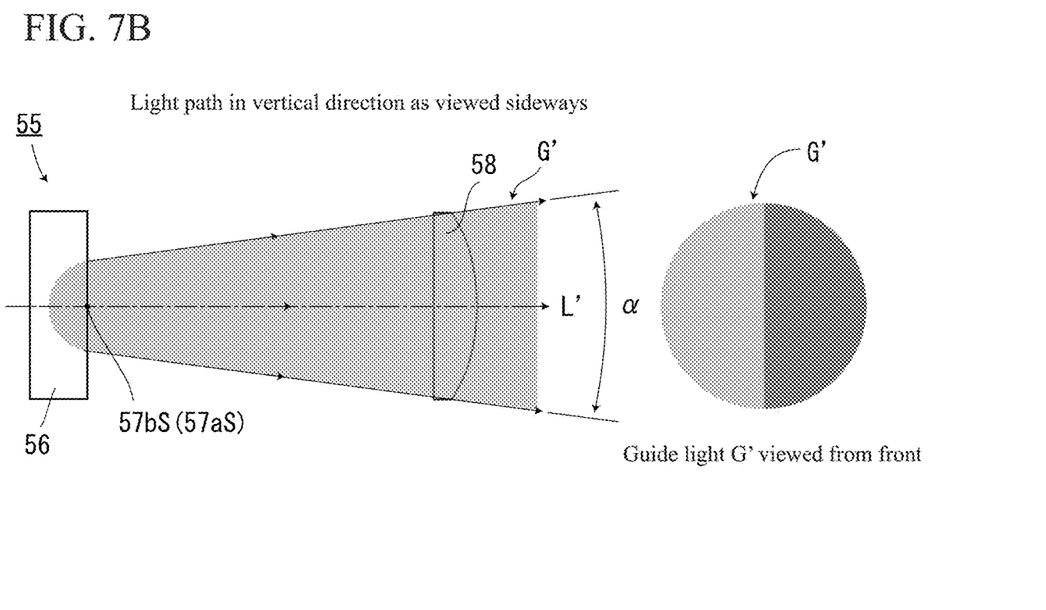

The irradiator 55 is described with reference to FIGS. 7A and 7B. In FIGS. 7A and 7B, for describing a state of the basic guide light G', the irradiated light is colored. In FIG. 7B, a light-emitting diode 57a, 57b is omitted and only the light source 57aS, 57bS is illustrated, and because dispositions of the light sources 57aS and 57bS match each other in a side view, one light source disposed at the rear side is noted in parentheses.

As illustrated in FIGS. 7A and 7B, the irradiator 55 includes, as optical systems, a pair of light-emitting diodes 57a and 57b, a right-angle mirror 56, and a lens 58 that is a collimating lens as a condenser lens.

The right-angle mirror 56 has reflecting surfaces 56a and 56b, and the angle formed by these is a right angle. The right-angle mirror 56 is disposed so that a ridge of the reflecting surfaces 56a and 56b matches a vertical plane passing through a rear focal point of the lens 58 on an optical axis L' of the lens 58. The reflecting surfaces 56a and 56b face the lens 58 side, and tilt at equal angles in directions opposite to the optical axis L'. The red light-emitting diode 57a is disposed on a reflecting optical axis La of one reflecting surface 56a, and the green light-emitting diode 57b is disposed on a reflecting optical axis Lb of the other reflecting surface 56b.

Diaphragm portions 59a and 59b are provided directly in front of the red light-emitting diode 57a and the green light-emitting diode 57b. The diaphragm portions 59a and 59b serve to cut each of the respective lights in half.

Red light irradiated from the light source 57aS of the red light-emitting diode 57a is reflected by the reflecting surface 56a, and similarly, green light emitted from the light source 57bS of the green light-emitting diode 57b is reflected by the reflecting surface 56b, and are irradiated as basic guide light G' from the lens 58 while being divided into two emission colors by the vertical plane including the optical axis L'.

The basic guide light G' that has exited from the lens 58 is irradiated forward in an irradiation direction set along the optical axis L' while being diffused at a diffusion angle α as an expansion angle in both of the vertical direction and the horizontal direction (diffused by α/2 to each side of the optical axis L' as a center). An apex of the right-angle mirror 56 is disposed at an image forming position (rear focal point) when looking into the lens 58 from a distance, so that a boundary between the red light and the green light can be projected sharply and clearly.

(Guide Light Irradiation Unit)

Figure 8:
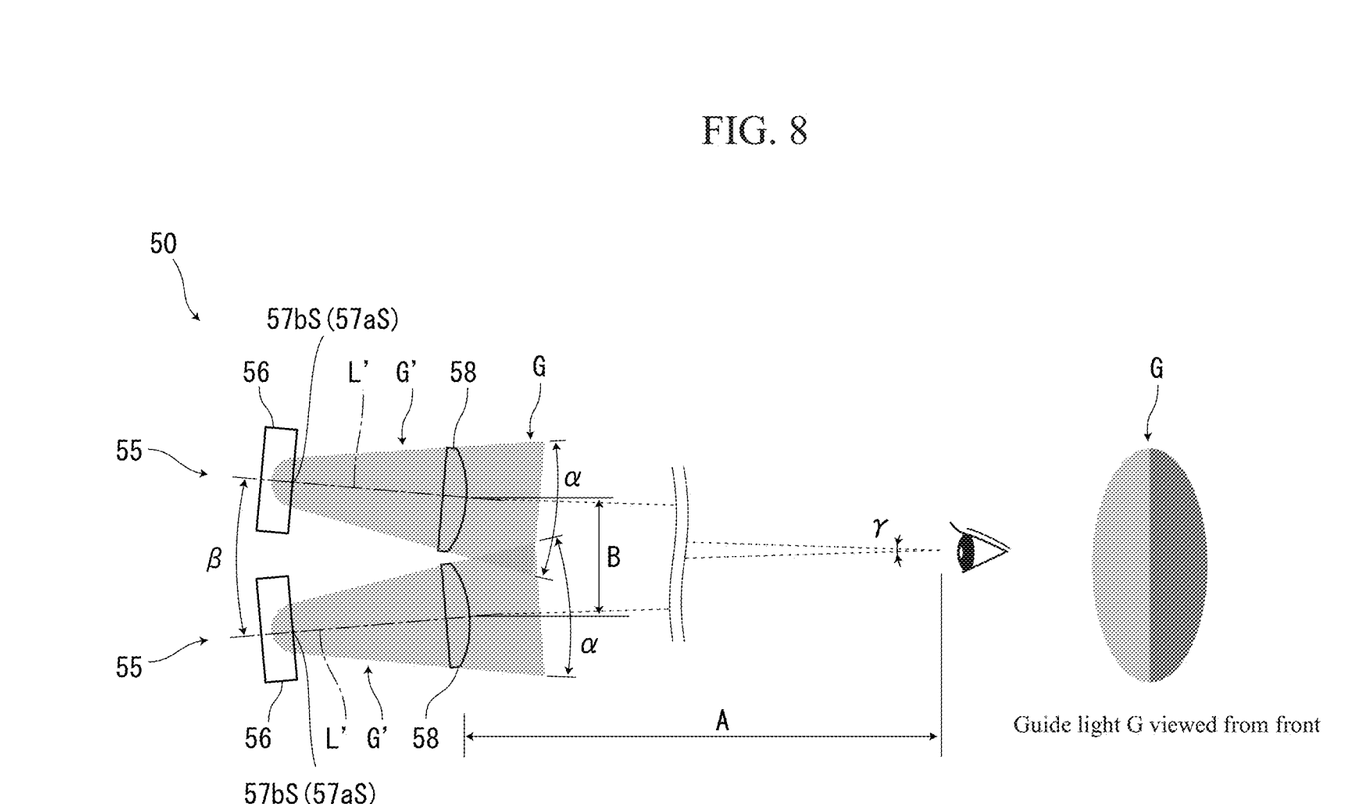
FIG. 8 is an explanatory view for describing the dispositions of irradiators equipped in a guide light irradiation unit, and is an optical diagram of the guide light irradiation unit in the vertical direction as viewed sideways.

The guide light irradiation unit 50 in which the two irradiators 55 are disposed is described with reference to FIG. 8. The two irradiators 55 and 55 are arranged one above the other while tilting the end portion sides with the lenses 58 close to each other so that optical axes L' and L' of the two irradiators 55 and 55 substantially match in a plan view, and form a predetermined angle β with each other in the vertical direction.

The dispositions are adjusted so that the angle β in the vertical direction between the two irradiators 55 and 55 becomes smaller than the light diffusion angle α of a single irradiator 55 in the vertical direction. By adjusting the dispositions in this manner, generation of a gap that is not covered by irradiation ranges of the irradiators 55 and 55 can be prevented.

Here, a disposition distance B between the irradiators 55 and 55 (distance between centers of the lenses) is set so that, on the assumption that an assumed use distance of the guide light irradiation unit 50 is defined as an assumed use distance A, an angle γ (γ=tan$^{-1}$(B/A)*180/π) between line segments from a point at the assumed use distance A from the unit to the centers of the lenses 58 becomes 1 arc-minute (1/60 degrees) or less. This is because, since an angle resolution (visual angle) of a human eye having 20/20 vision is 1 arc-minute, when a plurality of light sources are present in a range of a visual angle of 1 arc-minute or less, the light sources are viewed as not individual light sources but one light source as a sum of brightnesses of the respective light sources viewed singly. That is, by setting the angle γ to 1 arc-minute or less, lights irradiated from the irradiators 55 and 55 are viewed as being summed for an operator, and an effect of extending a reach distance of the synthesized guide light G to be longer than the basic guide light G' of a single irradiator 55 is obtained.

Further, two irradiators 55 and 55 are arranged one above the other, the two irradiators 55 and 55 irradiate light in a state where the optical axes L' are tilted at equal angles upward and downward from the horizontal, so that the guide light G is extended to be longer in the up-down direction than the basic guide light G', and this enables use at a location with level differences, and enables the guide light G to be easily found.

An apparent optical axis L as an irradiation direction of the guide light G irradiated from the guide light irradiation unit 50 is a sum of the optical axes L' (as vectors) of the two irradiators 55. In the present embodiment, the two irradiators 55 and 55 are disposed one above the other at equal angles, so that the optical axis L becomes horizontal, and the guide light G is irradiated while being diffused evenly in the up-down direction.

It is also possible to adjust the angles of disposition of the irradiators 55 in line with a surveyable angle of the surveying instrument 1. For example, when a use range of the surveying instrument 1 in the vertical direction is from +55° to −30°, by adjusting the dispositions of the irradiators 55 so that the optical axis L is oriented slightly upward from the horizontal, guide light G matching the specifications of the surveying instrument 1 can be irradiated.

(Disposition of Guide Light Irradiation Unit)

Figure 9:
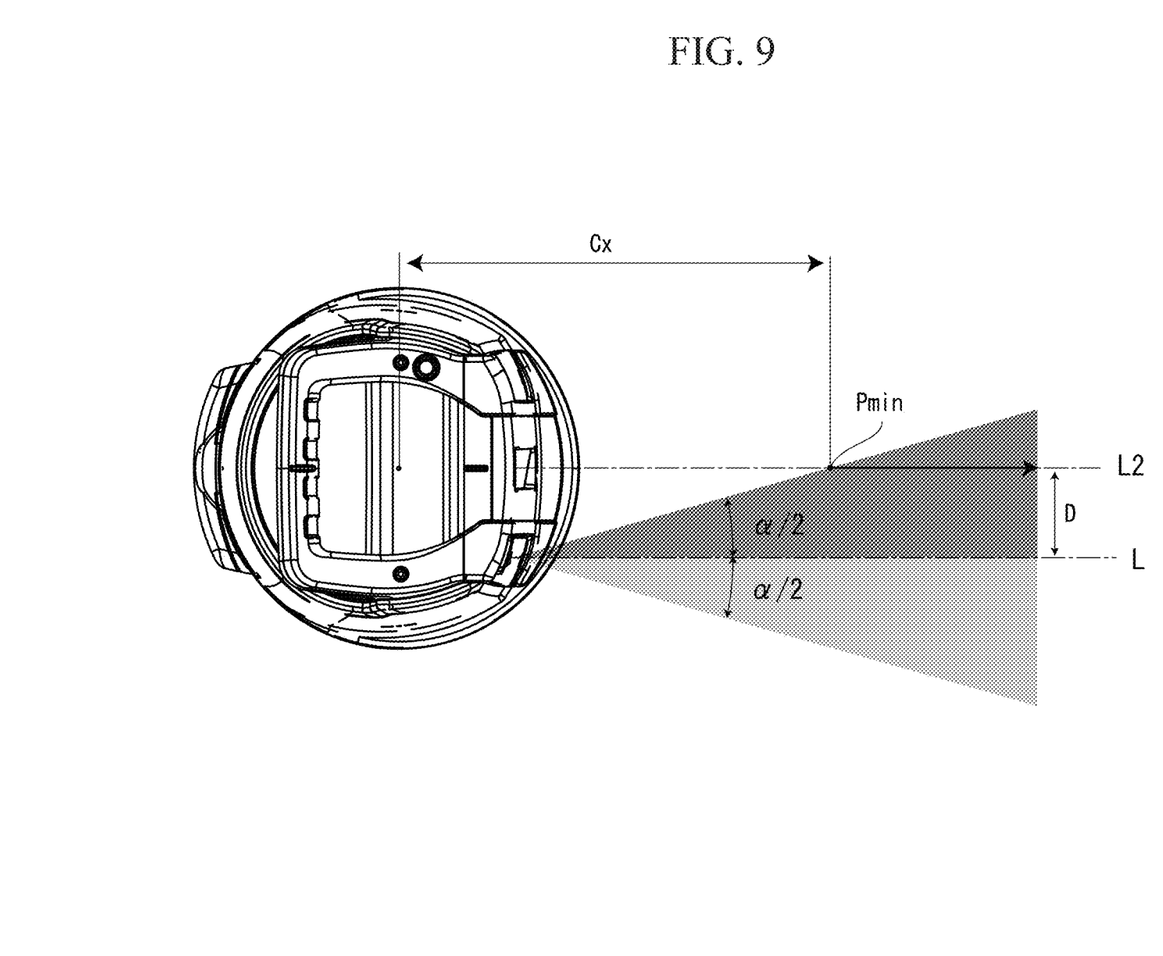
FIG. 9 is an explanatory view for describing the disposition of a guide light irradiation unit.

Here, the disposition of the guide light irradiation unit 50 is described. As illustrated in FIG. 9, the optical axis L of the guide light irradiation unit 50 and the optical axis L2 of the lens barrel portion 8 are parallel to each other in a plan view, and respective vertical planes including the optical axes are at a distance D from each other. That is, the guide light irradiation unit 50 is disposed to be shifted by the distance D horizontally from the lens barrel portion 8.

Here, when Pmin is an intersection between the guide light G and the optical axis L2, the guide light G can be visually recognized at and ahead of the intersection Pmin, (refer to the arrow in FIG. 9). A diffusion angle of the guide light G in the horizontal direction is equal to the diffusion angle α of the basic guide lights G', so that when Cx is a distance from the surveying instrument 1 (central point as a reference) to the intersection Pmin, the following relationship holds.

$$\tan(\alpha/2) \times Cx = D$$

Here, when the distance Cx to the intersection Pmin is a shortest use distance Cmin of the surveying instrument 1 (Cx=Cmin), the guide light G is visually recognized from the shortest use distance of the surveying instrument 1. When Dmax is a distance between the optical axes in the horizontal direction at this time, the relational expression is as follows.

$$\tan(\alpha/2) \times Cmin = Dmax$$

Here, when the guide light irradiation unit 50 is disposed so that the distance D in the horizontal direction becomes less than Dmax (Dmax>D), the guide light G can be visually recognized from the shortest use distance of the surveying instrument 1. In other words, a visual recognition range of the guide light G becomes equal to that in a case where the optical axis of the guide light irradiation unit 50 is disposed so as to substantially match the collimation axis on a horizontal plane, and the effect from shifting of the optical axes from each other in the horizontal direction is negated. Therefore, the distance D is set so as to satisfy:

$$\tan(\alpha/2) \times Cmin > D$$

For example, when it is assumed that the shortest use distance Cmin=900 mm and the diffusion angle α of the guide light G in the horizontal direction=8°, $$\tan(8°/2) \times 900 \approx 62.8 \text{ mm}$$

is provided, so that by disposing the guide light irradiation unit 50 at a position of less than 62.8 mm horizontally from the optical axis L2, the guide light G can be visually recognized even from a position at the shortest use distance of 900 mm of the surveying instrument 1, and the visual recognition range of the guide light G becomes substantially equal to that in the case where the optical axis of the guide light irradiation unit 50 is disposed so as to substantially match the collimation axis on a horizontal plane.

As long as the surveying instrument 1 is used near the shortest use distance Cmin, even if guidance by the guide light G is not given, the front surface of the surveying instrument 1 can be visually recognized because the distance is short, so that there is no problem in actual use.

In most situations, because the guide light G is confirmed from a location at a distance of several meters or more, this level of offset distance is sufficiently negligible. First, an operator is guided to the vicinity of the piling point P by the guide light G, and then, a distance and an angle to the prism 60 are measured, and accordingly, the piling point P is highly accurately settled.

(Modification)

Although a preferred embodiment of the present invention has been described above, the embodiment described above is an example of the present invention.

Figure 10:
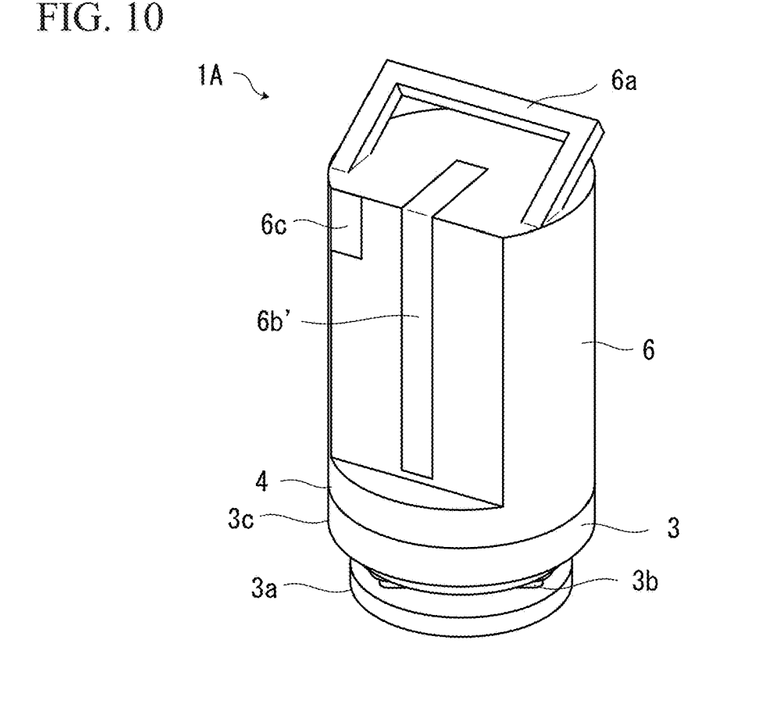
FIG. 10 illustrates an example of a modification.

A surveying instrument 1A is illustrated as a modification in FIG. 10. A window 6b' of the surveying instrument 1A extends in the up-down direction on the front surface of the cover member 6, and is further continuously extended from an upper end of the front surface to the middle of the upper surface, to be formed over the two surfaces of the front surface and the upper surface. Support members 7 and 7 are a pair of columns, and a lens barrel portion 8 positioned between the support members 7 and 7 is rotatably supported by a horizontal shaft 8A provided across the support members 7 and 7, and can face straight up as well. A guide light irradiation unit 50 is disposed not straight over the lens barrel portion 8 but disposed by separating at a distance D horizontally, so that only the cover member 6 is present above the lens barrel portion 8. Further, a handle portion 6a is provided by tilting so as to avoid the center of the upper surface. Therefore, the window 6b' can be formed by extending to the upper surface of the cover member 6. Accordingly, the use range of the surveying instrument 1A can be further expanded, and the maximum angle can be increased to approximately +90°. In this embodiment, it is preferable that the irradiation range of the guide light G in the vertical direction is also extended by, for example, using three or more irradiators 55 for the built-in guide light irradiation unit 50 and disposing the irradiators 55 at equal angles.

Figure 11:
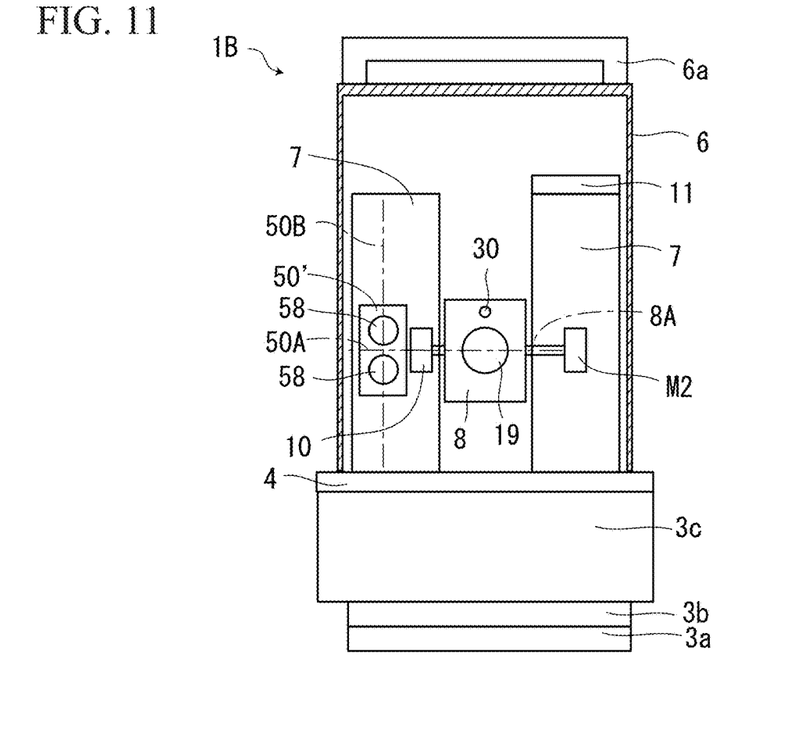
FIG. 11 illustrates an example of a modification.

FIG. 11 illustrates a surveying instrument 1B of another modification. In this modification, the disposition of a guide light irradiation unit 50' substantially matches the disposition of a lens barrel portion 8 in the up-down direction. With this configuration, the angle relationship between the guide light irradiation unit 70' and the lens barrel portion 8 in the vertical direction becomes equal, so that it no longer becomes necessary to consider adjustments, etc.

As illustrated in FIG. 11, the guide light irradiation unit 50' may be held by one support member 7 so as to become rotatable around a horizontal axis 50A.

Alternatively, the guide light irradiation unit 50' may be held by the support member 7 so as to become slidable on a vertical axis 50B. With this configuration, the irradiation range of the guide light G can be expanded in the vertical direction. In this case, it is preferable that the guide light window 6c is also formed in line with the configuration described above, and extended vertically, or further continuously extended to the upper surface in the same manner as the window 6b'.

Such modifications and combinations can be made based on knowledge of a person skilled in the art, and these forms are also included in the scope of the present invention.

REFERENCE SIGNS LIST

1 Surveying instrument
3 Base portion
4 Rotating pedestal
5 Surveying instrument main body
6 Cover member
6b Window
7 Support member
8 Lens barrel portion
8A Horizontal shaft
50 Guide light irradiation unit
55 Irradiator
G Guide light
α Diffusion angle (of guide light)

The invention claimed is:

1. A surveying instrument comprising:
a surveying instrument main body made up of a base portion and a rotating pedestal to be rotated horizontally with respect to the base portion;
a guide light irradiation unit configured to irradiate guide light to indicate a collimation direction of the surveying instrument main body to a survey operator; and
a cover member, in which on the rotating pedestal, a support member by which a lens barrel portion of a distance-measuring optical system is vertically rotatably supported is provided, and the cover member covers the surveying instrument main body including the support member and the lens barrel portion and covers the guide light irradiation unit, wherein
the guide light consists of light differing in pattern between the left and the right of an optical axis center of the guide light irradiation unit,
the guide light irradiation unit is horizontally shifted with respect to the lens barrel portion and held by the support member so that an optical axis of the guide light irradiation unit becomes substantially parallel to an optical axis of the lens barrel portion in the horizontal direction, and
a horizontal shift distance D between the optical axis of the guide light irradiation unit and the optical axis of the lens barrel portion satisfies:

$\tan(\alpha/2) \times C_{min} > D$ provided that α is an irradiation angle of the guide light in the horizontal direction, and Cmin is a shortest use distance of the surveying instrument.

2. The surveying instrument according to claim 1, wherein
the guide light irradiation unit includes a plurality of irradiators configured to irradiate basic guide lights differing in pattern between the left and the right of an optical axis center of the guide light irradiation unit,
the plurality of irradiators are juxtaposed in the vertical direction, and
combined light of basic guide lights respectively irradiated from the plurality of irradiators are visually recognized as guide light.

3. The surveying instrument according to claim 1, wherein
the cover member has a window on the optical axis of the lens barrel portion, and
the window is formed to extend from a substantially bottom surface to a substantially upper surface of the cover member.

4. The surveying instrument according to claim 3, wherein
the window is formed to extend from a substantially bottom surface to a substantially upper surface of the cover member, and to further extend over the upper surface so as to be continuous over the two surfaces.

5. The surveying instrument according to claim 1, wherein
the guide light irradiation unit is disposed so that a rotation shaft of the lens barrel portion and a guide light irradiation port of the light guide irradiation unit substantially match in the up-down direction.

6. The surveying instrument according to claim 1, wherein
the guide light irradiation unit is supported by the support member vertically slidably or vertically rotatably.

* * * * *